United States Patent

Juntunen et al.

[11] Patent Number: 6,163,711
[45] Date of Patent: Dec. 19, 2000

[54] METHOD AND APPARATUS FOR INTERFACING A MOBILE PHONE WITH AN EXISTING AUDIO SYSTEM

[75] Inventors: Esa Juntunen, Irving, Tex.; Tapio Laurila, Oulu, Finland

[73] Assignee: Nokia Mobile Phones, LTD, Espoo, Finland

[21] Appl. No.: 08/980,942

[22] Filed: Dec. 1, 1997

[51] Int. Cl.[7] .................................................. H04B 7/00
[52] U.S. Cl. ............................ 455/557; 455/66; 455/575
[58] Field of Search .............................. 455/66, 556, 567, 455/568, 569, 90, 575, 92, 345, FOR 121; 379/420, 432, 447, 442

[56] References Cited

U.S. PATENT DOCUMENTS

| | | | |
|---|---|---|---|
| 4,591,661 | 5/1986 | Benedetto et al. | 179/2 EA |
| 4,734,897 | 3/1988 | Schotz | 369/2 |
| 4,811,390 | 3/1989 | Garabedian et al. | 379/390 |
| 4,864,550 | 9/1989 | Kawanaka | 369/6 |
| 5,243,640 | 9/1993 | Hadley et al. | 379/59 |
| 5,282,246 | 1/1994 | Yang | 379/455 |
| 5,319,716 | 6/1994 | McGreevy | 381/79 |
| 5,396,556 | 3/1995 | Chen | 379/446 |
| 5,471,530 | 11/1995 | Chen | 379/446 |
| 5,475,872 | 12/1995 | Sato | 455/89 |
| 5,483,692 | 1/1996 | Person et al. | 455/219 |
| 5,493,583 | 2/1996 | Cripps | 375/219 |
| 5,532,703 | 7/1996 | Stephens et al. | 343/702 |
| 5,568,538 | 10/1996 | Tamir et al. | 379/58 |
| 5,835,854 | 11/1998 | Palisson et al. | 455/186.1 |

FOREIGN PATENT DOCUMENTS

| | | |
|---|---|---|
| 0 495 360 | 7/1992 | European Pat. Off. . |
| 196 19 815 | 11/1997 | Germany . |
| 2 264 613 | 9/1993 | United Kingdom . |
| WO 96/32783 | 10/1996 | WIPO . |
| WO 98/12867 | 3/1998 | WIPO . |

OTHER PUBLICATIONS

"The New Generation Superb Hands Free Kit" from Accutech, printed from web site: http:/www.accutec.com/handfree.html on Jun. 9, 1997.

*Primary Examiner*—Thanh Cong Le
*Attorney, Agent, or Firm*—Eleanor M. Musick; Brian T. Rivers

[57] ABSTRACT

A hands-free adapter for interfacing a mobile phone handset with an existing audio system attaches to the handset by means of the accessory connectors that are generally located on the bottom or back of the handset. The adapter modulates the received audio from an in-coming call with a pre-selected FM or AM carrier frequency, and broadcasts the resulting, low power signal to the antenna of a receiver of the existing audio system, which may include a home stereo system, a portable stereo system, or a vehicle radio. The receiver is tuned to the carrier frequency used by the adapter so that the in-coming audio from the mobile phone can be heard over the audio system speakers. For Radio Data System (RDS)-capable radio receivers, a processor is provided within the adapter to generate channel data, which is then transmitted with the carrier signal. The RDS-capable radio receives the RDS signal and automatically tunes itself to the selected channel. An optional processor can be used to control internal and input/output signals through automatic functions which may include volume control, frequency search, and frequency tuning.

12 Claims, 4 Drawing Sheets

METHOD AND APPARATUS FOR INTERFACING A MOBILE PHONE WITH AN EXISTING AUDIO SYSTEM

FIELD OF THE INVENTION

This invention relates generally to accessories for mobile telephones, and more specifically to an apparatus and method for interfacing a mobile phone with an existing audio system for hands-free use of the mobile telephone.

BACKGROUND OF THE INVENTION

Mobile phone use is pervasive in today's society including use in the home, at work, and in the car. The use of a mobile phone while operating a motor vehicle typically involves holding the mobile phone handset in one hand while using the other hand for steering, shifting gears, adjusting the radio volume, or any of a number of activities. The distraction of handling a mobile phone while driving poses a threat to the safety of the driver and others in the vicinity of the driver and vehicle. Studies have equated driving while using a mobile phone with driving under the influence of alcohol or drugs in terms of the number of accidents caused. Legislation is being considered or has already been enacted in many countries banning the use of hand-held mobile phones while driving. In the United Kingdom, for example, penalties for using such a mobile phone while driving, even if no accident results, can include imprisonment and/or a substantial fine.

Solutions to this problem have appeared in the form of mobile phone hands-free systems. Some automobiles are equipped with a mobile phone hands-free system during manufacture. These systems may integrate a mobile phone with the car audio system, such as the system disclosed in U.S. Pat. No. 5,243,640 of Hadley et al., which is incorporated herein by reference. Hadley's invention describes an interface that effectively shares an output transducer and amplifier between an audio system and a phone in a vehicle. The advantage of this system is clear if it is installed in the car during manufacture. However, drivers of vehicles without this feature who, nonetheless, desire to have the hand-free convenience must have an aftermarket system installed into their vehicles at a cost which may be substantial. Further, an aftermarket installation in a vehicle can often effect the aesthetics of a vehicle interior which was not expressly designed to receive such an installation. Another disadvantage is that the system, as described, is not portable. As a result, a similar system must be installed into every audio system that is used by the mobile phone owner.

An alternate solution for providing hands-free phone operation is in the purchase and use of a mobile phone hands-free kit. These kits are portable and require very little, if any, installation. Such kits, which may have their own audio amplifier and speaker(s), are usually compact, and thus, the audio output of the speakers is typically "tinny". Further, increasing the volume of such speakers to a level sufficient to hear a soft-spoken person at the other end of the connection while in a noisy background can result in distortion of much of the conversation. In contrast, a vehicle's existing audio system, which may be factory-installed or an aftermarket addition, is often sophisticated and of high sound quality, capable of sustaining increased volumes without distortion. Even the most basic audio system that is installed during manufacture of a vehicle avoids the high, thin and metallic sound quality that is present in many currently available hands-free kits.

The interfacing of separate audio components into a vehicle audio system is known. In one example, the use of an automobile audio system for portable Compact Disk (CD) players is disclosed in U.S. Pat. No. 5,319,716 of McGreevy, which is incorporated herein by reference. The wireless radio adapter described therein accepts the stereo signal of a CD player, via an audio-out jack, and transmits a stereo FM (Frequency Modulation) signal to a conventional automobile FM radio. The adapter is configured to accept the right and left stereo inputs of a playback device, and does not have the capability to accept audio from a mobile phone. Further, the McGreevy adapter does not provide a plurality of automatic functions via the use of an internal processor.

In view of the failure of the prior art to provide a solution, the need remains for a means for readily interfacing a mobile phone with an existing audio system, such as in a vehicle, which is economical, portable, and easy to install. Further, it would be desirable to provide a "smart" device that accepts audio from a mobile phone, provides optional receive and transmit functions, and interfaces with an AM or FM receiver of an audio system by means of a low power RF signal transmission.

SUMMARY OF THE INVENTION

It is an advantage of the present invention to provide a portable, hands-free interface between a mobile phone and any of a plurality of audio systems including audio systems in a vehicle, a home, and a boat.

It is another advantage of the present invention to provide an economical accessory kit that can interface a standard mobile phone to any audio system that has an AM or FM radio receiver, cassette player, or auxiliary audio input.

Still another advantage of the present invention is to provide a "smart" interface having a plurality of functions through the use of an internal processor.

Yet another advantage is to provide means for easy installation of the interface into the vehicle which does not require significant modification to the vehicle interior to attach extraneous accessories.

In an exemplary embodiment of the present invention, a hands-free adapter attaches to a mobile phone handset by means of the accessory connectors that are generally located on the bottom or back of the handset. The adapter modulates the received audio from the in-coming call with the pre-selected FM or AM carrier frequency, and broadcasts the resulting, low power signal to the antenna of a receiver, which may include a home stereo system, a portable stereo system, or a vehicle radio. The receiver is tuned to the carrier frequency used by the adapter so that the in-coming audio from the mobile phone can be heard over the vehicle's audio system. For Radio Data System (RDS)-capable radio receivers, a processor is provided within the adapter to generate channel data, which is then transmitted with the carrier signal. The RDS-capable radio receives the RDS signal and automatically tunes itself to the selected channel.

The user's speech is picked up by a high frequency microphone that plugs into the adapter and which is placed in relatively close proximity to the user's mouth. The detected speech is amplified and sent to the mobile phone via an audio out signal line, where it is modulated and transmitted as part of the mobile phone's normal operation.

Power sources for the circuitry in an adapter include a mobile phone battery, or a vehicle or another external battery. To conserve battery power, the adapter processor monitors whether the phone is the "call mode" and transmits or ceases transmission to the vehicle radio accordingly. This "ON/OFF mode" processor function conserves the handset's battery power.

In an alternative embodiment of the present invention, the system has the additional feature of a built-in Radio Data System (RDS) radio receiver and FM radio. The RDS radio receives RDS data which is sent to the mobile phone for display on the screen of the mobile phone. This enhanced system also allows the user to use the phone as an FM radio. A connector on the adapter provides a connection for headsets or earphones.

In yet another embodiment of the present invention, the above described systems, with and without the RDS receiver and FM radio, are built into the holder/cradle of the mobile phone handset, eliminating the need for a separate adapter.

For situations where a decreased RF output is highly desirable, for example, where the user wishes to minimize the chance of the signal being picked up by other near-by radios, a hard-wired embodiment of the hands-free interface may be installed. In a hard-wired embodiment of the present invention, the modulator which is in addition to, or part of, the adapter assembly is installed between the vehicle radio and the vehicle radio antenna. An RF cable connects the modulated RF audio signal to the antenna of the vehicle radio. The hard-wired embodiment significantly reduces the required power of the signal and possibility of stray transmission.

In still another embodiment of the present invention, the adapter makes use of one or more cables to establish an interface from the mobile phone to the vehicle's audio system. One type of cable interface makes use of a cassette player, which is included in many vehicle audio systems. For example, as disclosed in U.S. Pat. No. 4,734,897 of Schotz, which is incorporated herein by reference, an adapter is formed in the general shape of a cassette tape which houses a recording head positioned to contact the playback head of a cassette player. The adapter is used as an interface from the headphone jack of a playback device, such as a compact disk player, to the cassette player audio system. In this embodiment an audio "out" circuit and a jack which interfaces the adapter to the plug of the above described cassette adapter may be provided. An alternative type of cable interface may be used to connect the adapter directly to audio input jacks that are commonly present on vehicle radios, CD players, and/or cassette players.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which.

DETAILED DESCRIPTION OF THE PREFERRED EMBODIMENTS

The following detailed description utilizes a number of acronyms which are generally well known in the art. While definitions are typically provided with the first instance of each acronym, for convenience, Table 1 below provides a list of the acronyms and abbreviations and their respective definitions.

TABLE 1

| ACRONYM | DEFINITION |
| --- | --- |
| AFS | Automatic Frequency Search |
| AFT | Automatic Frequency Tuning |
| AM | Amplitude Modulation |
| AVC | Automatic Volume Control |
| DAF | Detected Audio Frequency |
| FM | Frequency Modulation |
| HF | High Frequency |
| PLL | Phase Locked Loop |
| RDS | Radio Data System |
| RF | Radio Frequency |

Figure 1:
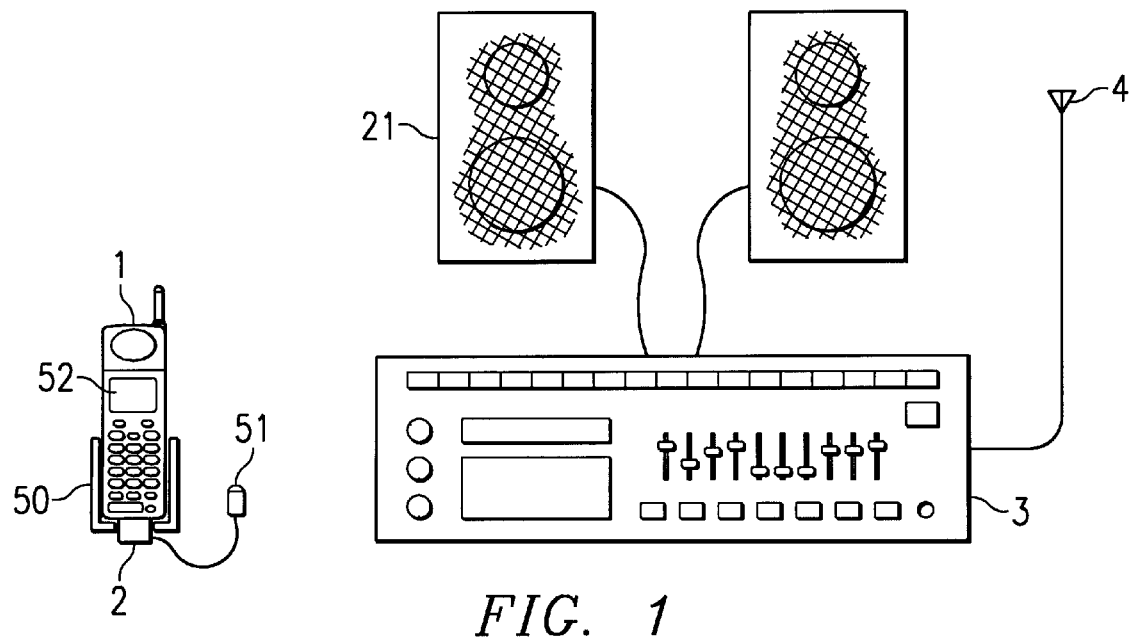
FIG. 1 is a block diagram that illustrates the overall concept of a Mobile Phone Hands-Free Interface of the present invention.
Figure 7:
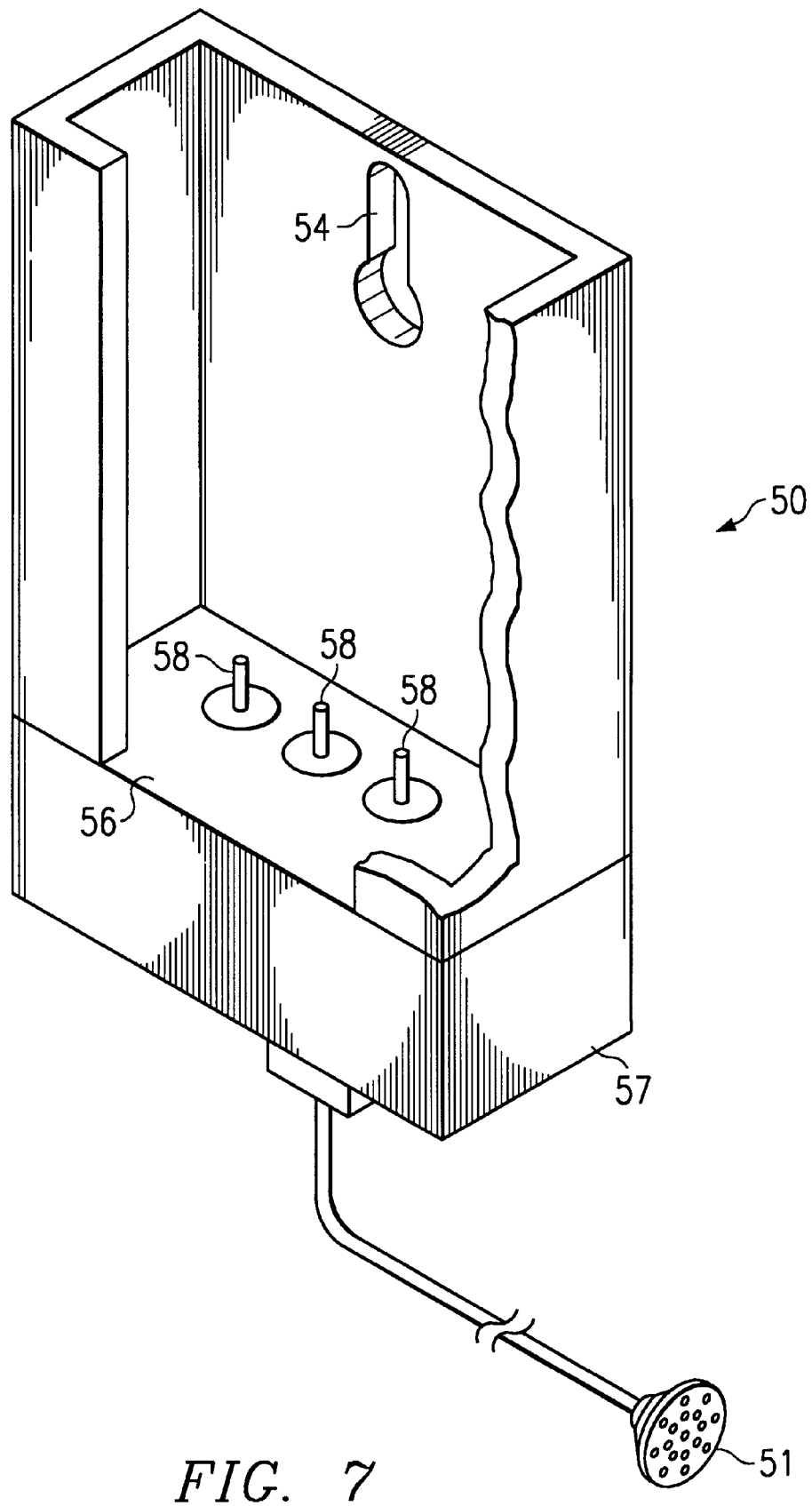
FIG. 7 is a perspective view of a handset cradle for use in the present invention.

Referring to FIG. 1, a conventional mobile phone handset, which is generally designated by reference numeral 1, is connected to an accessory adapter 2 by placing it in a specially-designed cradle 50 or other support means which provides an electrical connection between the mobile phone handset 1 and adapter 2. Details of exemplary means for connection are shown in FIG. 7, in which is illustrated cradle 50 comprising a substantially four-walled housing into which the phone handset 1 (not shown) may be inserted. Cradle 50 includes means for hanging on a fixed surface such as a car dashboard or center console. In the example shown, keyhole 54 may be used for hanging on a screw or peg. Cradle 50 may also be attached using, for example, an adhesive means or hook-and-pile fastener, or may have a clip for hanging on an existing structure on the fixed surface. At the inside bottom surface 56 of cradle 50 are electrical connectors 58 which are adapted to mate with the accessory connectors of handset 1 when the handset is inserted therein. The accessory connectors may include audio input and output means and an attachment for an external power supply. Depending on the configuration of the handset, positioning of the electrical connectors 58 may vary. In a preferred embodiment, the electronic circuitry hereinafter described will be housed within casing 57 at the lower portion of cradle 50, with at least one connector for attachment of the input wiring from microphone 51 and other external input/output devices.

Referring again to FIG. 1, the adapter 2 receives a detected audio frequency (DAF) signal from the mobile phone, and subsequently modulates and transmits the signal on a low power, RF carrier. This signal is received by an AM or FM radio 3 via the existing antenna of the radio 4, and output through the vehicle's existing speakers 21. The adapter 2, or alternatively the phone handset 1, provides a connection for a high frequency (HF) microphone accessory 51 which may be attached to a visor, steering wheel, or some other place in a proximity to pick-up the handset user's speech.

Figure 2:
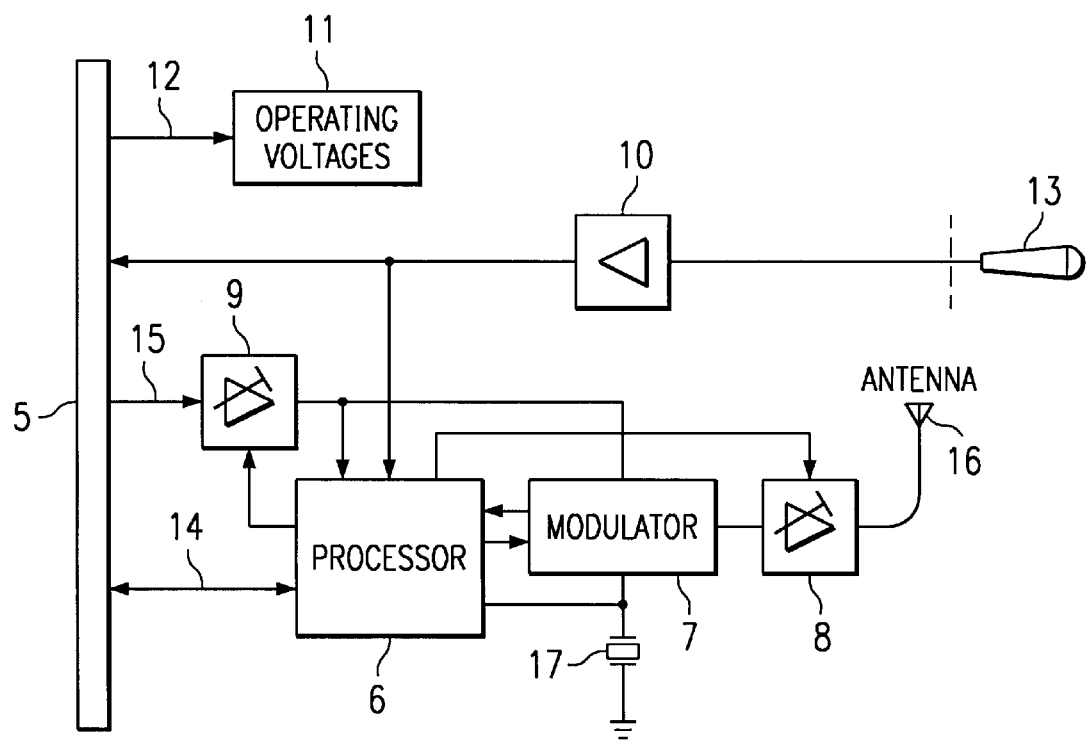
FIG. 2 is an electrical schematic illustrating a circuit configuration of a Mobile Phone Hands-Free Interface according to a first embodiment of the present invention.

FIG. 2 illustrates the basic circuitry of the hands-free audio system interface. In the first embodiment of the present invention, the interface comprises of power circuitry 11, a processor 6, a high frequency (HF) amplifier 10 for an HF microphone 13, a DAF attenuator 9, a modulator circuit 7, a power level controller 8, and an antenna 16.

The power circuitry 11 generates operating voltages for the electrical components of the adapter. The source voltage for this circuitry is input through the accessory connector 5 via the input voltage line 12. The source voltage is derived from a battery within the adapter, or may be provided by an independent source outside of the adapter such as, but not limited to, the mobile phone battery or the vehicle battery.

The detected audio frequency (DAF) waveform 15 from the mobile handset 1 is fed into the adapter 2 through the accessory connector 5. The audio waveform passes through the DAF attenuator 9 that, together with the processor 6, comprises an audio modulation level controller. The processor, which determines level control parameters and other adapter functions, receives information from the mobile phone via the serial communications bus 14. Audio modulation level control may be attained automatically by automatic volume control (AVC). Automatic volume control is provided via the processor 6 which uses the audio input from HF microphone 13 to measure the noise level in the vehicle, and sets the gain of the DAF attenuator 9 accordingly.

The attenuated DAF signal is fed into the remaining RF transmission circuitry, which is generally represented in FIG. 2 by a crystal oscillator 17, a modulator circuit 7, which includes a phase-locked loop (PLL) to maintain the carrier at the correct frequency, and a power amplifier 8. The AM or FM modulated signal is transmitted though the antenna 16 and is received by the AM or FM radio of the vehicle. The processor 6 is used to set the carrier frequency of the modulator 7 and control the gain of the power amplifier 8. The anticipated low power output of the RF signal will comply with the FCC regulations for intentional radiators. (The appropriate FCC regulations are generally known to those skilled in the art.)

The modulator 7 frequency may be pre-set by the user using the selection function of the mobile phone handset 1 menu, or may be set automatically. The HF microphone feedback circuitry 13, 10 to the processor 6 provides the capability of automatic frequency search (AFS). The processor 6 generates a short pulse to the modulator 7, and the modulated pulse is transmitted to the vehicle's radio via the antenna 16.

The processor 6 then monitors the received signal for the return of the pulse via the HF microphone 13 and HF amplifier 10. This process is repeated over a sequence of AM and FM frequencies either serially, or based on pre-set frequencies, until the carrier frequency matches the tuned frequency of the vehicle. When the frequencies match, the HF microphone 13 picks up the feedback audio and the processor 6 stops the scanning and lock on to the desired frequency.

Another function of the processor 6, the ON/OFF control, is to terminate transmission when the phone is not in the "call mode" to conserve the handset's battery power.

In an embodiment of the adapter for interface with an RDS-compatible radio, the processor 6 may also provide the additional function of generating Radio Data System (RDS) data for transmission to the RDS vehicle radio. As is known in the art, RDS is a digital information system which transits data modulated on a subcarrier to RDS capable FM radio receivers. The data contains information such as program service, clock time, and radio text that may be viewed on the radio display, as well as data that can be used by the radio to provide automatic functions such as volume control and frequency tuning. The RDS data is sent in sequences called groups where each group type comprises 4 blocks of 26 bits each, consisting of a 16 bit information word followed by a 10-bit check word. The specification for RDS, incorporated herein by reference, is described in European Standard CENELEC EN 50 067 (April 1992), "Specification of the radio data system", and in NRSC United States RBDS Standard Jan. 8, 1993, "Specification of the radio broadcast data system". The transmitted RDS data does not affect the operation of a normal vehicle radio.

The processor 6 and modulator circuitry 7 of the exemplary embodiment may be designed to include RDS capability that will provide the mobile phone user with a plurality of functions including automatic frequency tuning (AFT) of the RDS vehicle radio. When a call is received or made, the processor 6 generates RDS data which includes alternate frequencies (AF) information within Group Type OA and Enhanced Other Networks (EON) information within Group Type 14B, as described in the aforementioned European and United States standards. The RDS data from the processor 6 is introduced into the modulator circuitry 7 where it is modulated with the subcarrier, then transmitted with the modulated audio signal to the RDS vehicle radio. The AF and EON information is used by the RDS vehicle radio, in accordance with the standards, to automatically tune the radio to the desired channel.

Figure 3:
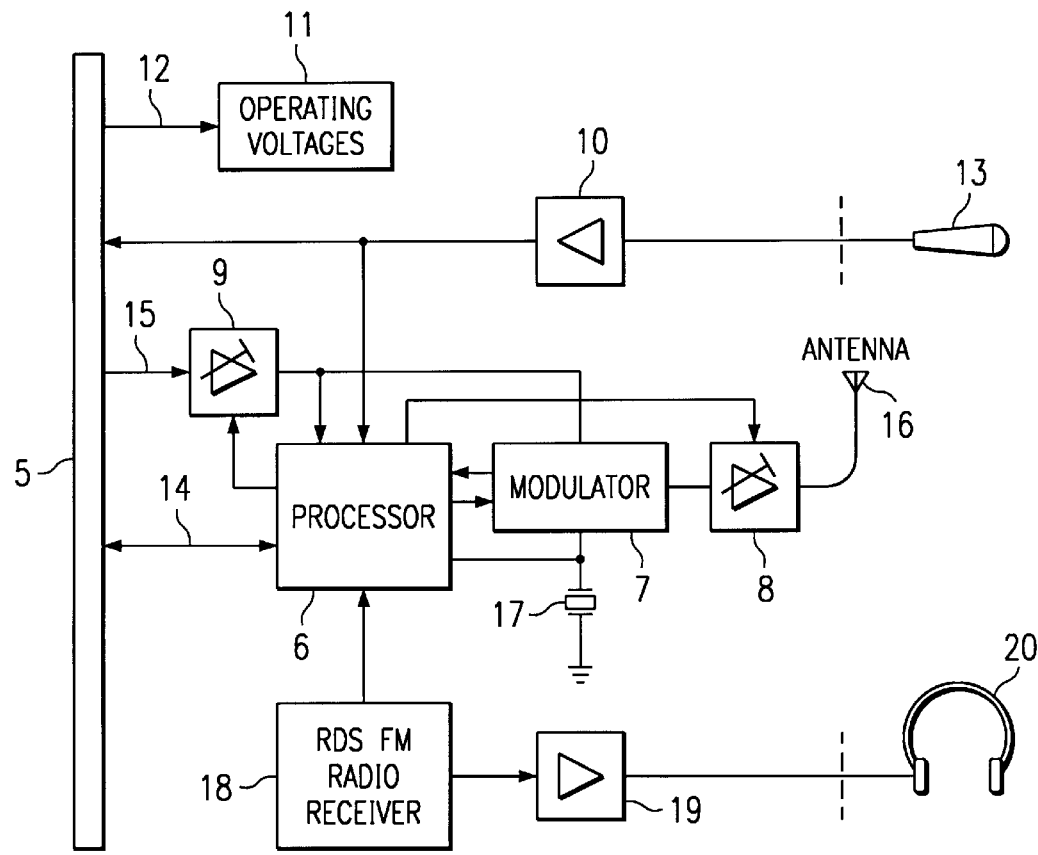
FIG. 3 is an electrical schematic of a second alternate embodiment of the interface circuit having an RDS Receiver/FM Radio and related circuitry.

An alternative embodiment of the invention, illustrated in FIG. 3, a variation of the embodiment of FIG. 2, includes the addition of an RDS FM radio receiver 18. The receiver 18 can receive RDS data and relay the information to the processor 6, which, in turn, communicates the information via the communications bus 14 to the display screen of the mobile handset 1. An audio amplifier 19 and a connection for a headset, earphones 20 or other type of listening device, allow the user to listen to the RDS FM radio receiver. Inclusion of an RDS FM radio into the adapter provides a convenient RDS information display means through use of the mobile phone handset display without having to buy and install additional or replacement equipment for the vehicle audio system.

Figure 4:
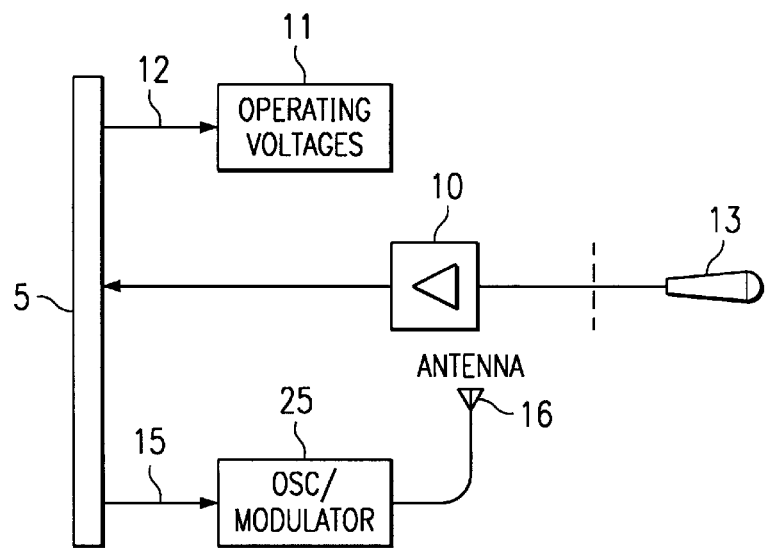
FIG. 4 is a schematic diagram of a third alternate embodiment of the interface.

In another embodiment illustrated in FIG. 4, a basic adapter accepts a detected audio frequency (DAF) signal 15 from the mobile handset 1 through the accessory connector 5, modulates the signal, and transmits the signal through the antenna 16 to the vehicle radio. The oscillator and modulator circuitry 25 of this embodiment comprises standard FM transmitter circuitry that is well known in the art, and a manual tuner for the transmission frequency. The audio signal from the HF microphone 13 is amplified 10 and sent to the mobile handset 1. The source voltage for the operating voltage circuitry 11 is input through the accessory connector 5 via the input voltage line 12.

Figure 5:
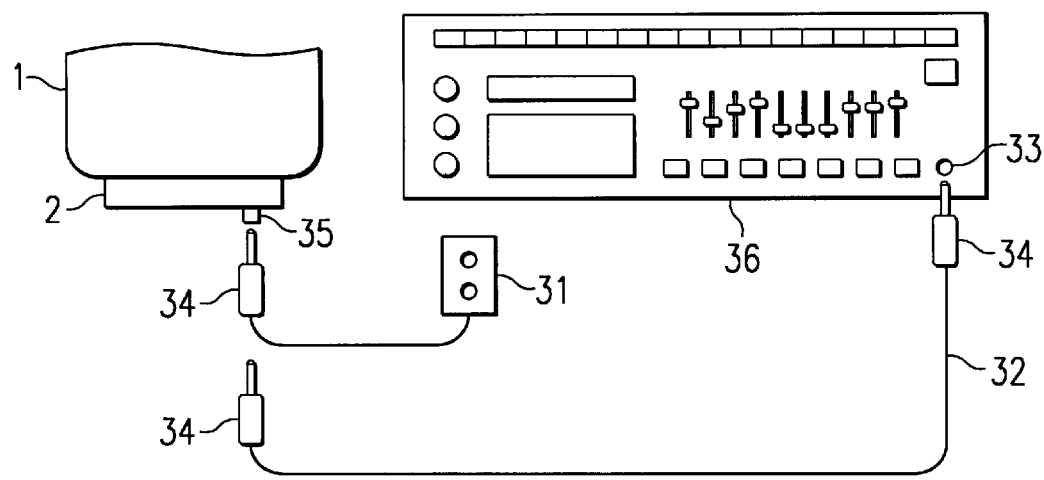
FIG. 5 is a block diagram showing an embodiment using the alternative interface means of a cassette player accessory, and an auxiliary audio input cable accessory.

FIG. 5 illustrates alternative embodiments of the adapter that make use of one or more cables to establish an interface to the automobile's audio system. The detected audio frequency (DAF) signal from the mobile phone handset 1 is input through the mobile phone accessory connector 5, amplified, and output to a standard "audio-out" jack 35 located on the adapter 2. The adapter "audio-out" jack 35 accepts a standard audio plug 34, and thus, the adapter 2 may then be used with a number of cable devices to interface the audio signal from the mobile handset 1 to electronic equipment 36, such as a cassette player or CD player, that makes use of an audio system. Referring to FIG. 5, two types of accessory cables are shown to exemplify a variety of different cable interfaces that may be used with the adapter 2. The two cables 31, 32 are alternative cable interfaces, and are not intended for use in combination. The first alternative interface employs a cassette player adapter-cable 31 as disclosed in U.S. Pat. No. 4,734,897 of Schotz, referenced above, and the second alternative interface makes use of a standard plug-plug cable 32 to complete the connection to an auxiliary audio input 33 that may be available on the installed electronic equipment 36.

Figure 6:
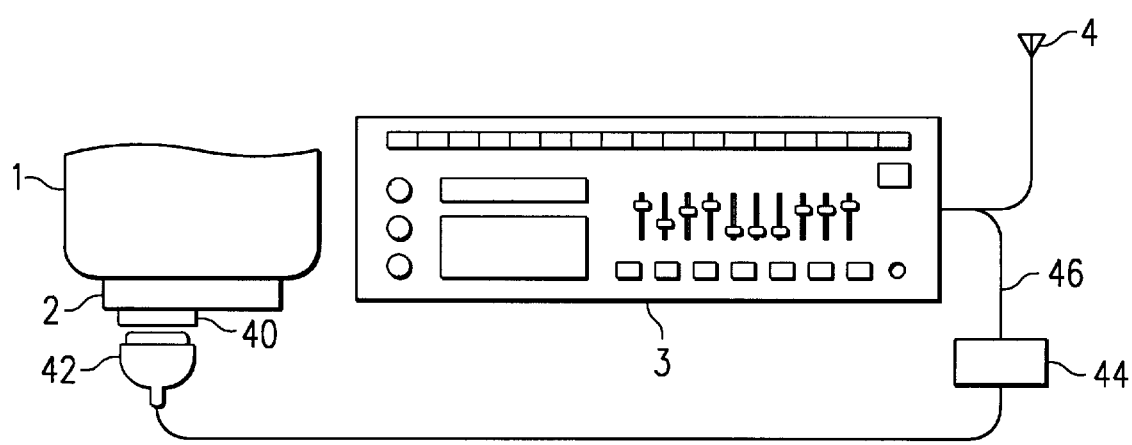
FIG. 6 is a block diagram showing a hard-wired embodiment.

An alternative embodiment having a hard-wired configuration is illustrated in FIG. 6. The hard-wired embodiment employs an RF cable 46 to transmit an injected RF signal from the output of an external modulator 44 to an RF connector of the radio receiver antenna 4. Audio and control signals are supplied to the external modulator 44 via an accessory jack and cable 40, 42.

The preferred embodiments as described herein provide a means for hands-free use of a mobile phone handset via an interface that is portable and wireless, that does not require disruptive or costly installation, and that makes use of an existing audio system. Such an interface provides the improved safety of hands-free operation while providing high quality sound to enhance the intelligibility of the received speech. While the invention is particularly described in its applicability to facilitating the use of mobile phones in vehicles, other uses are anticipated, including, for example, the use of the interface with a portable stereo can provide a portable speaker phone for conference calls, even while the user is out of his or her office, or can allow a user to set up an impromptu speaker phone at home using a home stereo system.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. An adapter for interfacing a handset with an audio system having at least one speaker and at least one antenna for receiving an input signal to an AM/FM radio, said handset having a transceiver for receiving and decoding an incoming communication signal and for encoding and transmitting an outgoing communication signal, said handset further having a plurality of accessory connectors, said adapter comprising:

a connection means for connecting the handset to the adapter, the adapter receiving a decoded audio input signal from the handset;

a modulator circuit connected to said connection means, said modulator circuit for receiving said decoded audio input signal and for providing at least one level of modulation including modulation of said decoded audio input signal with a carrier frequency, and for generating an output signal comprising a modulated audio signal;

a transmission means for transmitting said modulated audio signal to the at least one antenna of said AM/FM radio, wherein said modulated audio signal is conducted to said at least one speaker;

a microphone connected to said connection means, said microphone for receiving a user's speech and generating a microphone audio output signal, wherein said microphone audio output signal is conducted to said connection means and to said modulator circuit;

a processor cooperating with said modulator circuit for conducting an automatic frequency search for an unused or a low-use frequency of the audio system, wherein said processor generates a short pulse to said modulator circuit and a modulated pulse is transmitted to the AM/FM radio, and wherein the processor then monitors a received pulse signal for the return of the short pulse via said microphone, and wherein the pulse is repeated over a sequence of AM and FM frequencies until said processor verifies the received pulse signal; and a power input means for providing at least one operating voltage to said modulator circuit, said transmission means and said microphone.

2. The adapter as in claim 1, wherein said processor includes means for producing RDS data.

3. The adapter as in claim 2, wherein said at least one level of modulation further includes a subcarrier modulation for modulating said RDS data on a subcarrier frequency.

4. The adapter as in claim 1, wherein said processor includes automatic volume control capability for automatically controlling an audio volume, wherein the processor utilizes the audio output signal from the microphone to measure the noise level in the vehicle and sets a gain of the output signal.

5. The adapter as in claim 1, wherein said transmission means comprises a circuit having a power amplifier and a transmitting antenna for amplifying and transmitting said modulated audio signal to said receiving antenna.

6. The adapter as in claim 1, wherein the at least one antenna of the AM/FM radio further includes a receiving antenna connector, and wherein said transmission means comprises:

an RF cable connector connected to said modulated audio signal; and an external RF cable for connecting said RF cable connector to said receiving antenna connector.

7. The adapter as in claim 1, further comprising support means disposed on a fixed surface for releasably supporting said handset.

8. The adapter as in claim 7, wherein said support means comprises a cradle for receiving the handset and having said connection means fixedly disposed therein.

9. The adapter as in claim 8, wherein said electrical connection means includes means for connecting said power input means to said handset for powering said handset.

10. The adapter as in claim 1, wherein said handset further comprises a display screen, and said adapter further comprises an RDS receiver circuit for receiving an external radio signal containing RDS data, wherein said RDS receiver circuit is connected to said processor for communicating said RDS data for display on said display screen of said handset.

11. The adapter as in claim 10, wherein the processor further provides an automatic frequency tuning operation for tuning said at least one receiving means to a frequency channel indicated within said external radio signal.

12. A method for interfacing a handset with an audio system for hands-free operation, wherein the handset includes a transceiver for receiving and transmitting communication signals, a display screen, a microphone for receiving audio signals, and a plurality of accessory connectors, and the audio system includes an RF receiver pre-tuned to an unused frequency and at least one speaker, the method comprising:

(a) initializing a search frequency;

(b) transmitting a search signal on the search frequency to said RF receiver;

(c) waiting a pre-determined time to receive the search signal via said microphone;

(d) if the search signal is received by said microphone, then adjusting said carrier frequency to match said search frequency;
(e) if the search signal is not received, then adjusting the search frequency; and
(f) repeating steps (b)–(e) until the search signal is received by the microphone; and
(g) when the search signal is received by said microphone:

(h) converting, within said transceiver, an incoming communication signal including a speech signal into an audio input signal;
(i) modulating an RF carrier signal with said audio input signal to generate a modulated audio signal corresponding to said speech signal;
(j) transmitting said modulated audio signal to said RF receiver so that said speech signal may be played over said at least one speaker.

* * * * *